United States Patent
Wallace

(10) Patent No.: US 10,795,860 B1
(45) Date of Patent: Oct. 6, 2020

(54) WAN OPTIMIZED MICRO-SERVICE BASED DEDUPLICATION

(71) Applicant: EMC IP Holding Company LLC, Hopkinton, MA (US)

(72) Inventor: Grant R. Wallace, Pennington, NJ (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 15/486,609

(22) Filed: Apr. 13, 2017

(51) Int. Cl.
- G06F 16/17 (2019.01)
- G06F 16/174 (2019.01)
- H04L 29/08 (2006.01)
- G06F 16/13 (2019.01)
- G06F 16/14 (2019.01)

(52) U.S. Cl.
CPC ........ G06F 16/1748 (2019.01); G06F 16/137 (2019.01); G06F 16/152 (2019.01); G06F 16/1744 (2019.01); H04L 67/1097 (2013.01)

(58) Field of Classification Search
CPC ................ G06F 17/30159; G06F 16/1748
See application file for complete search history.

(56) References Cited

U.S. PATENT DOCUMENTS

| | | | |
|---|---|---|---|
| 7,085,911 B2 | 8/2006 | Sachedina et al. | |
| 7,818,515 B1 | 10/2010 | Umbehocker et al. | |
| 8,046,551 B1 | 10/2011 | Sahin | |
| 8,190,835 B1 | 5/2012 | Yueh | |
| 8,204,868 B1 | 6/2012 | Wu et al. | |
| 8,396,841 B1 | 3/2013 | Janakiraman | |
| 8,732,403 B1 | 5/2014 | Nayak | |
| 8,782,323 B2 | 7/2014 | Glikson et al. | |
| 8,898,114 B1 | 11/2014 | Feathergill et al. | |
| 8,898,120 B1 | 11/2014 | Efstathopoulos | |
| 8,904,120 B1 | 12/2014 | Killammsetti et al. | |

(Continued)

FOREIGN PATENT DOCUMENTS

| | | | |
|---|---|---|---|
| EP | 2738665 A1 | 6/2014 | |
| WO | 2013056220 A1 | 4/2013 | |

(Continued)

OTHER PUBLICATIONS

Deepavali Bhagwat et al.; "Extreme Binning: Scalable, Parallel Deduplication for Chunk-based File Backup"; IEEE MASCOTS; Sep. 2009 (10 pages).

(Continued)

*Primary Examiner* — Mohammad S Rostami
(74) *Attorney, Agent, or Firm* — Chamberlain, Hrdlicka, White, Williams & Aughtry

(57) ABSTRACT

A system for managing an object storage includes frontend micro-services and backend micro-services. The frontend micro-services obtain a request to store data in an object storage; divide the data into slices; send a slice analysis request, based on a slice of the slices, to the backend micro-services; obtain, from the plurality of backend micro-services, a list of segments of the slice that are not stored in the object storage; and add a segment specified by the list of segments to a compression region. The backend micro-services identify segments of the slice specified by the slice analysis request that are not stored in the object storage and generate the list of segments of the slice based on the identified segments.

17 Claims, 9 Drawing Sheets

(56) References Cited

U.S. PATENT DOCUMENTS

| | | |
|---|---|---|
| 8,918,390 B1 | 12/2014 | Shilane et al. |
| 8,943,032 B1 | 1/2015 | Xu et al. |
| 8,949,208 B1 | 2/2015 | Xu et al. |
| 9,183,200 B1 | 11/2015 | Liu et al. |
| 9,244,623 B1 | 1/2016 | Bent et al. |
| 9,250,823 B1 | 2/2016 | Kamat et al. |
| 9,251,160 B1 | 2/2016 | Wartnick |
| 9,274,954 B1 | 3/2016 | Bairavasundaram et al. |
| 9,280,550 B1 | 3/2016 | Hsu et al. |
| 9,298,724 B1 | 3/2016 | Patil et al. |
| 9,317,218 B1 | 4/2016 | Botelho et al. |
| 9,336,143 B1 | 5/2016 | Wallace et al. |
| 9,390,116 B1 | 7/2016 | Li et al. |
| 9,390,281 B2 | 7/2016 | Whaley et al. |
| 9,424,185 B1 | 8/2016 | Botelho et al. |
| 9,442,671 B1 | 9/2016 | Zhang et al. |
| 9,830,111 B1 | 11/2017 | Patiejunas et al. |
| 10,002,048 B2 | 6/2018 | Chennamsetty et al. |
| 10,031,672 B2 | 7/2018 | Wang et al. |
| 10,078,451 B1 | 9/2018 | Floyd et al. |
| 10,102,150 B1 | 10/2018 | Visvanathan et al. |
| 10,175,894 B1 | 1/2019 | Visvanathan et al. |
| 10,445,292 B1 | 10/2019 | Zhang et al. |
| 2003/0110263 A1 | 6/2003 | Shillo |
| 2005/0120058 A1 | 6/2005 | Nishio |
| 2005/0160225 A1 | 7/2005 | Presler-Marshall |
| 2005/0182906 A1 | 8/2005 | Chatterjee et al. |
| 2006/0075191 A1 | 4/2006 | Lolayekar et al. |
| 2008/0082727 A1 | 4/2008 | Wang |
| 2008/0133446 A1* | 6/2008 | Dubnicki ............ G06F 17/30159 |
| 2008/0133561 A1* | 6/2008 | Dubnicki ............ G06F 11/1453 |
| 2008/0216086 A1 | 9/2008 | Tanaka et al. |
| 2008/0244204 A1 | 10/2008 | Cremelie et al. |
| 2009/0235115 A1 | 9/2009 | Butlin |
| 2009/0271454 A1 | 10/2009 | Anglin et al. |
| 2010/0049735 A1 | 2/2010 | Hsu |
| 2010/0094817 A1 | 4/2010 | Ben-Shaul et al. |
| 2010/0250858 A1 | 9/2010 | Cremelie et al. |
| 2011/0055471 A1 | 3/2011 | Thatcher et al. |
| 2011/0099200 A1 | 4/2011 | Blount et al. |
| 2011/0099351 A1 | 4/2011 | Condict |
| 2011/0161557 A1 | 6/2011 | Haines et al. |
| 2011/0185149 A1 | 7/2011 | Gruhl et al. |
| 2011/0196869 A1 | 8/2011 | Patterson et al. |
| 2011/0231594 A1 | 9/2011 | Sugimoto et al. |
| 2011/0276781 A1 | 11/2011 | Sengupta et al. |
| 2012/0158670 A1 | 6/2012 | Sharma et al. |
| 2012/0209873 A1 | 8/2012 | He |
| 2012/0278511 A1 | 11/2012 | Alatorre et al. |
| 2013/0036098 A1 | 2/2013 | Mutalik et al. |
| 2013/0060739 A1 | 3/2013 | Kalach et al. |
| 2013/0111262 A1 | 5/2013 | Taylor et al. |
| 2013/0138620 A1 | 5/2013 | Yakushev et al. |
| 2014/0012822 A1* | 1/2014 | Aronovich ............ G06F 3/0641 707/692 |
| 2014/0040205 A1 | 2/2014 | Cometto et al. |
| 2014/0047181 A1 | 2/2014 | Peterson et al. |
| 2014/0258248 A1 | 9/2014 | Lambright et al. |
| 2014/0258824 A1 | 9/2014 | Khosla et al. |
| 2014/0281215 A1 | 9/2014 | Chen et al. |
| 2014/0310476 A1 | 10/2014 | Kruus |
| 2015/0074679 A1 | 3/2015 | Fenoglio et al. |
| 2015/0106345 A1 | 4/2015 | Trimble et al. |
| 2015/0178171 A1 | 6/2015 | Bish et al. |
| 2015/0331622 A1 | 11/2015 | Chiu et al. |
| 2016/0026652 A1 | 1/2016 | Zheng |
| 2016/0112475 A1* | 4/2016 | Lawson ............... H04L 65/403 709/204 |
| 2016/0188589 A1* | 6/2016 | Guilford .......... G06F 17/30156 707/692 |
| 2016/0224274 A1 | 8/2016 | Kato |
| 2016/0239222 A1 | 8/2016 | Shetty et al. |
| 2016/0323367 A1* | 11/2016 | Murtha ................. H04L 67/10 |
| 2016/0342338 A1 | 11/2016 | Wang |
| 2017/0093961 A1* | 3/2017 | Pacella ................. H04L 69/16 |
| 2017/0199894 A1 | 7/2017 | Aronovich et al. |
| 2017/0220281 A1* | 8/2017 | Gupta .................. G06F 3/0604 |
| 2017/0220334 A1 | 8/2017 | Hart et al. |
| 2017/0300424 A1 | 10/2017 | Beaverson et al. |
| 2017/0352038 A1 | 12/2017 | Parekh et al. |
| 2017/0359411 A1* | 12/2017 | Burns ................ H04L 67/1002 |
| 2018/0089037 A1 | 3/2018 | Liu et al. |
| 2018/0146068 A1* | 5/2018 | Johnston ............ H04L 12/4641 |
| 2018/0322062 A1 | 11/2018 | Watkins et al. |

FOREIGN PATENT DOCUMENTS

| | | |
|---|---|---|
| WO | 2013115822 A1 | 8/2013 |
| WO | 2014185918 A1 | 11/2014 |

OTHER PUBLICATIONS

Mark Lillibridge et al.; "Sparse Indexing: Large Scale, Inline Deduplication Using Sampling and Locality"; 7th USENIX Conference on File and Storage Technologies, USENIX Association; pp. 111-pp. 123; 2009 (13 pages).

International Search Report and Written Opinion issued in corresponding PCT Application PCT/US2018/027646, dated Jul. 27, 2018. (30 pages).

Extended European Search Report issued in corresponding European Application No. 18184842.5, dated Sep. 19, 2018.

Jaehong Min et al.; "Efficient Deduplication Techniques for Modern Backup Operation"; IEEE Transactions on Computers; vol. 60, No. 6; pp. 824-840; Jun. 2011.

Daehee Kim et al.; "Existing Deduplication Techniques"; Data Depublication for Data Optimization for Storage and Network Systems; Springer International Publishing; DOI: 10.1007/978-3-319-42280-0_2; pp. 23-76; Sep. 2016.

International Search Report and Written Opinion issued in corresponding WO application No. PCT/US2018/027642, dated Jun. 7, 2018 (15 pages).

Extended European Search Report issued in corresponding European Application No. 18185076.9, dated Dec. 7, 2018 (9 pages).

Lei Xu et al.; "SHHC: A Scalable Hybrid Hash Cluster for Cloud Backup Services in Data Center"; 2011 31st International Conference on Distributed Computing Systems Workshops (ICDCSW); IEEE Computer Society; pp. 61-65; 2011 (5 pages).

Aseem Kishore; "What is a Checksum and How to Calculate a Checksum"; Online Tech Tips; Feb. 18, 2015; https://www.online-tech-tips.com/cool-websites/what-is-checksum/.

* cited by examiner

WAN OPTIMIZED MICRO-SERVICE BASED DEDUPLICATION

BACKGROUND

Computing devices generate, use, and/or store data. The data may be, for example, images, document, webpages, or meta-data associated with any of the files. The data may be stored locally on a persistent storage of a computing device and/or may be stored remotely on a persistent storage of another computing device.

BACKGROUND

Computing devices generate, use, and/or store data. The data may be, for example, images, document, webpages, or meta-data associated with any of the files. The data may be stored locally on a persistent storage of a computing device and/or may be stored remotely on a persistent storage of another computing device.

SUMMARY

In one aspect, a system for managing an object storage in accordance with one or more embodiments of the invention includes frontend micro-services and backend micro-services. The frontend micro-services obtain a request to store data in an object storage; divide the data into slices; send a slice analysis request, based on a slice of the slices, to the backend micro-services; obtain, from the plurality of backend micro-services, a list of segments of the slice that are not stored in the object storage; and add a segment specified by the list of segments to a compression region. The backend micro-services identify segments of the slice specified by the slice analysis request that are not stored in the object storage and generate the list of segments of the slice based on the identified segments.

In one aspect, a method of managing an object storage in accordance with one or more embodiments of the invention includes obtaining, by a frontend micro-service, a request to store data in an object storage; dividing, by the frontend micro-service, the data into slices; sending, by the frontend micro-service, a slice analysis request to backend micro-service; obtaining, by the frontend micro-service, a list of segments of the slice of the slices that are not stored in the object storage from the backend micro-service; and adding, by the frontend micro-service, a segment specified by the list of segments to a compression region. The slice analysis request may include a sketch of a slice of the slices and a fingerprint of each segment of the slice of the slices.

In one aspect, a method of managing an object storage in accordance with one or more embodiments of the invention includes obtaining, by a backend micro-service, a slice analysis request; identifying, by the backend micro-service, segments specified by the slice analysis request that are not stored in the object storage; generating, by the backend micro-service, a list of segments that specifies each identified segment; and sending, by the backend micro-service, the list of segments to a client that sent the slice analysis request. The slice analysis request may include a sketch of a slice of data and a fingerprint of each segment of the slice.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
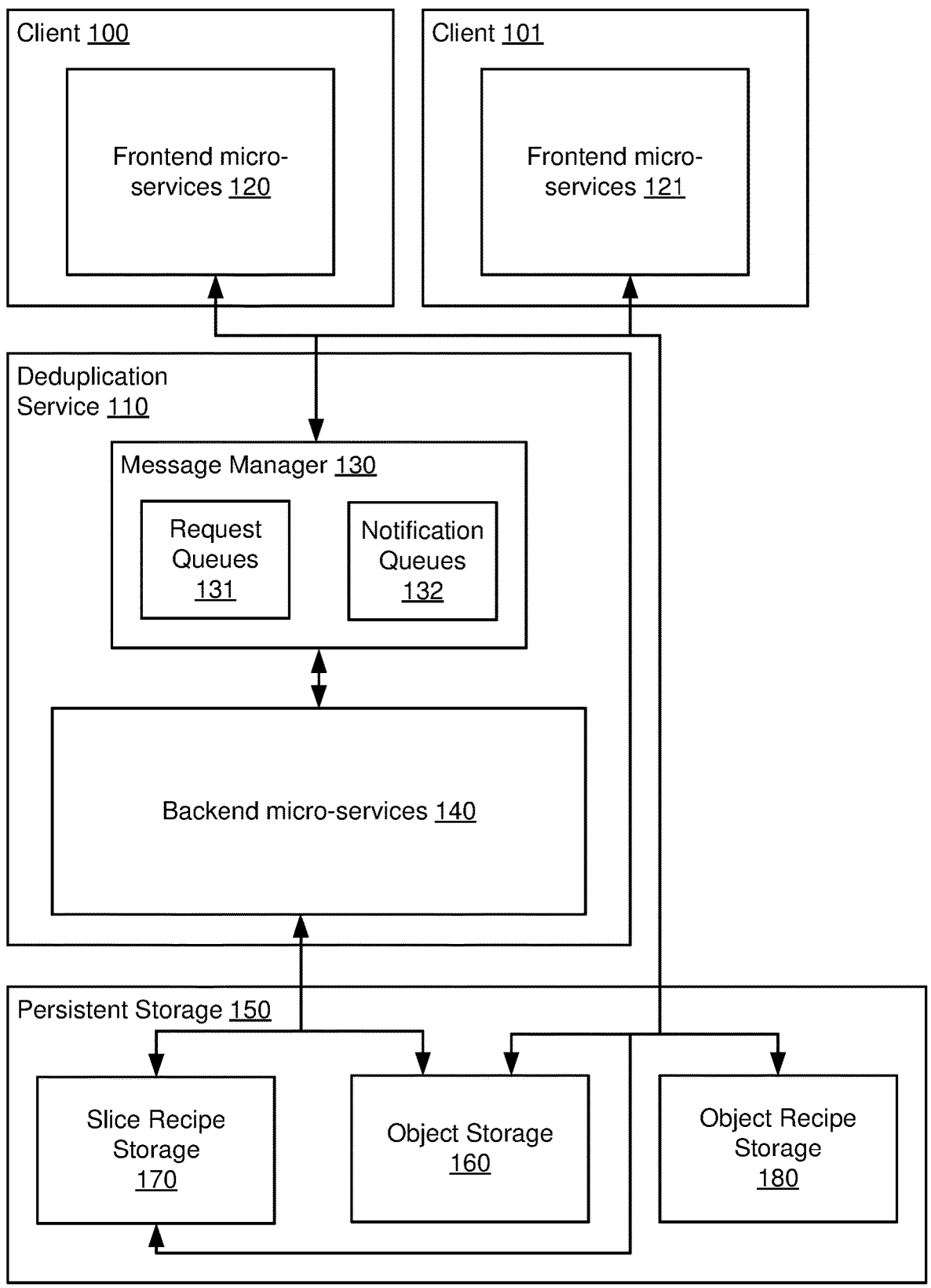
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to methods and systems for managing an object storage. More specifically, the methods and systems may provide functionality for deduplicating data before storing the data in the object storage. Deduplicating the data, before storing the data in the object storage, may increase the amount of data that can be stored in the object storage when compared to the amount of data that can be stored in the object storage without deduplicating the data. Deduplicating the data may also decrease the cost associated with storing data in the object storage by reducing the total amount of storage required to store the deduplicated data when compared to the amount of storage required to store the data without deduplicating the data.

As used herein, deduplication refers to methods of storing only portions of data that are not already stored in the storage. For example, when multiple versions of a large text document having only minimal differences between each of the versions are stored without deduplication, storing each version will require approximately the same amount of storage space of a persistent storage. In contrast, when the multiple versions of the large text document are stored with deduplication, only the first version of the multiple versions stored will require a substantial amount of storage. Once the first version is stored in a persistent storage, the versions of the large word document subsequently stored will be deduplicated before being stored in the persistent storage resulting in much less storage space of the persistent storage being required to store the subsequently stored versions when compared to the amount of storage space of the persistent storage required to store the first stored version.

In one or more embodiments of the invention, the method of deduplication may include receiving data and dividing the data into slices by one or more frontend micro-services executing on a client or a network device operably connected to a client. A sketch of each slice and fingerprints of each segment of each slice may be sent to one or more backend micro-services executing on a different computing platform. The different computing platform may be, for example, a cloud platform or another network device.

The backend micro-services may match each sketch to a similarity group and identify one or more segments of the slice that are not stored in the object storage using meta-data of the matched similarity group. The backend micro-services may notify the frontend micro-services of the segments that are not already stored in the object storage and add the fingerprint of each matched segment to the meta-data.

The frontend micro-services may add each segment that is not already stored in a slice to one or more compression regions and store the compression regions in the object storage. Slice recipes and object recipes that may be used to reconstruct each slice of the data and the data, respectively, may be stored so that the data now stored in the object storage may be read.

In one or more embodiments of the invention, the number of frontend micro-services and/or the number of backend micro-services may be dynamically adjustable. Adjusting the number of each micro-service may enable computing resources to be efficiently allocated to different portions of the method of deduplication. More efficiently allocating the computing resources used to store data in the storage may improve the data storage throughput rate of the storage, eliminate bottlenecks of the storage, decrease the cost of storage by dynamically deallocating reserved computing resources in response to changes in rates of storage, and/or provide a scalable data storage system.

FIG. 1 shows a system in accordance with one or more embodiments of the invention. The system may include clients (100, 101) that store data in an object storage (160) of a persistent storage (150). The system may include a deduplication service (110) that operates cooperatively with the clients (100, 101) to deduplicate the data from the clients (100) before the data is stored in the object storage (160).

The clients (100, 101) may be computing devices. The computing devices may be, for example, mobile phones, tablet computers, laptop computers, desktop computers, or servers. Further examples of clients (100) include clients that are running in the cloud, such as on a virtual machine or in a container running in a public and/or private cloud environment. The clients (100, 101) may be other types of computing devices and/or platforms without departing from the invention.

The clients may include frontend micro-services (120, 121) that obtain data from the clients (100, 101) for storage in the object storage (160), prepare the data for deduplication, deduplicate the data, and stores the data in the object storage (160). A frontend micro-service may perform the method shown in FIG. 4 to facilitate storage of data in the object storage (160).

The frontend micro-services (120) may also obtain requests for data stored in the object storage (160). The frontend micro-services may perform the method shown in FIG. 6 to facilitate reading of data from the object storage (160).

In one or more embodiments of the invention, the frontend micro-services (120) may be micro-services executing on the client (100, 101). In one or more embodiments of the invention, the frontend micro-services (120) may be executing on network devices other than the clients (100, 101). For example, the frontend micro-services (120) may be executing on a server that is operably connected to the clients, deduplication service (110), and/or the persistent storage (150) or a portion thereof. In one or more embodiments of the invention, the frontend micro-services (120) may be a plugin module executing as part of another application executing on the client or other network device. In one or more embodiments of the invention, the frontend micro-services (120) may be executing on a heterogeneous collection of clients and other network devices. For example, a first frontend micro-service may be executing on a client and a second frontend micro-service may be executing on another network device that is operably connected to at least a second client. The frontend micro-services (120) may be executing on other computing and/or network devices without departing from the invention.

While not illustrated in FIG. 1, the system may include load balancers. The load balancers may receive requests to store and/or obtain data in the object storage from one or more clients and distribute the requests to the frontend micro-services. The load balancers may be executing on clients or other network devices depending on the topological arrangement of the frontend micro-services and the clients. For example, a load balancer may be executing on another network device on which a number of frontend micro-services are executing. The load balancer may be operably connected to multiple clients and distribute client requests to store or read data of the object storage via the operable connections. In some embodiments the load balancer may be part of the deduplication service (110). For example, the load balancer may be between the clients (100, 101) and message manager (130).

In one or more embodiments of the invention, the number of frontend micro-services may be dynamically adjusted, i.e., additional instances of the frontend micro-services may be instantiated or existing instances of the frontend micro-service may be terminated. The number of frontend micro-services may be dynamically adjusted to, for example, match the request processing capacity of the frontend micro-services (120) to the rate of requests for storing data in the object storage from the client. For example, the number of requests from the clients may exceed the request processing capacity of the frontend micro-services (120) operably connected to a load balancer resulting in the development of a backlog of requests. In another example, the number of requests from the clients may be exceeded by the request processing capacity of the frontend micro-services (120) resulting in idle frontend micro-services. The number of frontend micro-services may be dynamically adjusted to match the rate of requests for storing/read data of the object storage. Each client may have a different number of frontend micro-services without departing from the invention.

The clients (100) may be operably connected to the deduplication service (110), the object storage (160), the slice recipe storage (170), and the object recipe storage (180).

The persistent storage (150) may be hard disk drives, solid state drives, any other type of persistent storage media, or a logical storage including any combination of the aforementioned storage media and/or other types of persistent storage. In one or more embodiments of the invention, the persistent storage (150) may be a cloud storage service. A cloud storage service may be a logical storage that includes any number of physical storage devices operable connected and/or unified to form a logical storage. The logical storage may include redundancy or other data integrity features that ensure that failure of any of the physical storage elements does not cause data stored in the logical storage to be lost.

The persistent storage (150) may include an object storage (160) for storing data from the clients (100), a slice recipe storage (170) for storing slice recipes, and an object recipe storage (180) for storing object recipes. The slice recipe storage (170) and/or the object recipe storage (180) may be stored on different devices and/or different persistent storage without departing from the invention. The slice recipe storage (170) and/or the object recipe storage (180) may be a portion of the object storage (160) without departing from the invention. For additional details regarding the object storage (160), the slice recipe storage (170), and the object recipe storage (180), see FIGS. 2A-2D.

As used herein, an object storage is a data storage architecture that manages data as objects. Each object of the object storage may include data, meta-data, and/or a globally unique identifier of the object. The object may include a number of bytes for storing data in the object. Each object of the object storage may include a different number of bytes without departing from the invention. In one or more embodiments of the invention, the object storage does not include a file system. For additional details regarding the object storage (160), see FIGS. 2A-2B.

The persistent storage (150) may be operably connected to the deduplication service (110) and/or the clients (100, 101).

The deduplication service (110) may cooperate with frontend micro-services to facilitate deduplication of data before storage of the data in the object storage. The deduplication service may match segments of data for storage in the object storage to segments of data already stored in the object storage. The deduplication service may notify the frontend micro-services of segments of the data that are already stored in the object storage. The deduplication service (110) may also provide slices of data, stored in the object storage, in response to requests for the slices from the frontend micro-services of the clients (100).

In one or more embodiments of the invention, the deduplication service (110) may be a service executing on a cloud platform, e.g., a platform as a service. As used herein, a cloud platform is a logical computing resource that abstracts the aggregated physical resources of one or more physical computing systems. One or more of the physical computing systems may be a physical device that includes non-transitory storage, memory (e.g. Random Access Memory), and one or more processors. The non-transitory storage may include instructions which, when executed by the one or more processors, enable the cloud platform to perform the functions described in this application and shown in FIGS. 5 and 7-8.

In one or more embodiments of the invention, the deduplication service (110) may be a physical device that includes non-transitory storage, memory (e.g. Random Access Memory), and one or more processors. The physical device may be, for example, a server. The physical device may be other types of computing devices without departing from the invention. The non-transitory storage may include instructions which, when executed by the one or more processors, enable the physical device to perform the functions described in this application and shown in FIGS. 5 and 7-8.

The deduplication service (110) may include backend micro-services (140) that analyze slices of data for storage in the object storage and/or a message manager (130) that manages requests and notifications between the frontend micro-services (120) of the clients (100, 101) and the backend micro-services (140). The analysis of the slices may include identifying one or more segments of data that are already stored in the object storage and notifying frontend micro-services (120) of segments of slices that are not stored in the object storage. The frontend micro-services (120) and backend micro-services (140) may also cooperate to provide data stored in the object storage to the clients (100). Each component of the deduplication service (110) is described below.

The message manager (130) may facilitate transmission of requests and notifications between the frontend micro-services (120) and the backend micro-services (140). In one or more embodiments of the invention, the message manager (130) may be a service executing on a cloud platform. In one or more embodiments of the invention, the message manager (130) may be a service executing on a network device that is separate from the computing resources on which the backend micro-services (140) are executing. The message manager (130) may include request queues (131) and notification queues (132). Each of the queues is discussed below.

The request queues (131) may be one or more queues that queue requests for analysis of slices by the frontend micro-services (120) for processing by the backend micro-services (140) or queue requests for reconstruction of slices of data stored in the object storage. Each of the queues of the request queues (131) may be first in first out queues. The queues of the request queues (131) may be other types of queues without departing from the invention. For example, the queues may be configured to prioritize certain slices for processing by the backend micro-services (140) over other slices, e.g., certain slices or analysis requests may be moved to the front of the queue based on a type, quality, or meta-data associated with the slices or analysis requests.

In one or more embodiments of the invention, a first queue may be assigned to facilitate storing of data in the object storage and a second queue may be assigned to facilitate reading of data from the object storage. For example, the first queue may send slices of data to the backend micro-services for processing when data is being stored in the object storage and the second queue may send reconstructed slices of data to the frontend micro-services for processing when data is being read from the object storage. The second queue may be a notification queue that enables a backend micro-service to send a reconstructed slice to a specified frontend micro-service. The first queue may be a request queue that enables a frontend micro-service to send a slice request or a slice to any backend micro-service without specifying the specific micro-service that will receive the request. In other words, the first queue may send requests to any backend micro-service while the second queue may send reconstructed slices to frontend micro-services that requested the slice that has been reconstructed by the backend micro-services.

The notification queues (132) may be messaging queues that enable the backend micro-services (140) and the frontend micro-services (120) to exchange confirmation of completion messages of any portion of the methods shown in FIGS. 4-7.

The backend micro-services (140) may be one or more micro-services that analyze slices of data to determine whether any segments of the slice are already present in the object storage. The backend micro-services may perform the method shown in FIG. 5 to facilitate storing of deduplicated data in the object storage. In one or more embodiments of the invention, the backend micro-services (140) may be micro-services executing on a cloud platform.

The backend micro-services (140) may also obtain requests for slices of data stored in the object storage (160). The backend micro-services may perform the method shown in FIG. 7 to facilitate providing slices of data stored in the object storage.

In one or more embodiments of the invention, the number of backend micro-services may be dynamically adjusted, i.e., additional instances of the backend micro-services may be instantiated or existing instances of the backend micro-service may be terminated, to match the slice processing capacity of the backend micro-services (140) to the rate of requests for analyzing slices of data and/or retrieving slices of data in the object storage from the clients (100). The number of backend micro-services may be dynamically adjusted by performing the method shown in FIG. 8.

In one or more embodiments of the invention, the backend micro-services and/or frontend micro-services may be adjusted based on a processing load and/or memory usage load of the hardware on which the deduplication service is executing.

The frontend micro-services and backend micro-services may utilize a number of storages to provide the functionality described herein. FIGS. 2A-2D shows diagrams of structures of the storages (160, 170, 180, FIG. 1) that may be utilized by the frontend and/or backend micro-services.

Additionally, while the frontend micro-services and backend micro-services have been described as separate services, embodiments of the invention are not limited to separate services performing the functionality of the frontend and backend micro-services, respectively. The functionality of the frontend and backend micro-services may be performed by a single service without departing from the invention. For example, a single service may perform the functionality, described herein, of both the frontend and backend micro-services.

Figure 2A:
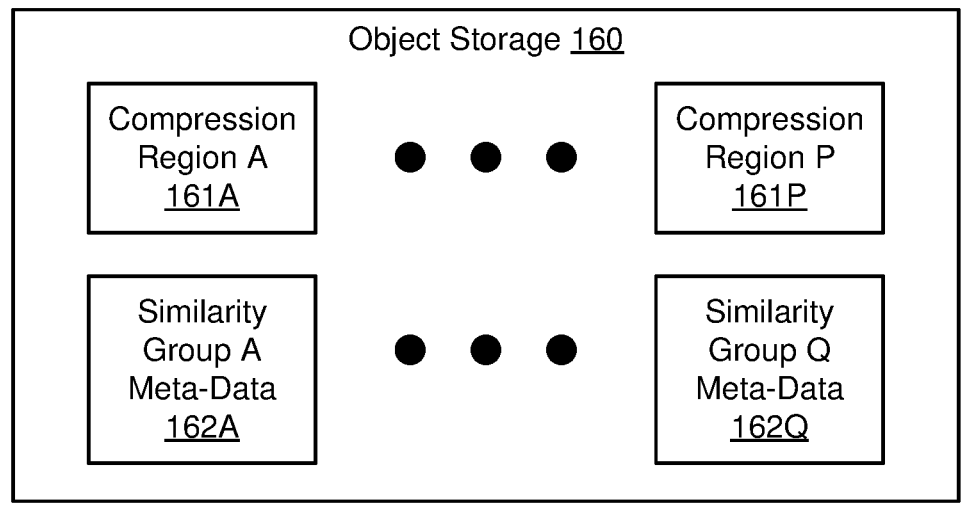
FIG. 2A shows a diagram of an object storage in accordance with one or more embodiments of the invention.

FIG. 2A shows an object storage (160) in accordance with one or more embodiments of the invention. The object storage (160) may store compression regions (161A, 161P) and similarity group meta-data (162A-162Q).

Each of the compression regions (161A, 161P) may store one or more segments of one or more slices of data. As used herein, a compression region is one or more pieces of data that are aggregated and/or compressed.

Each of the similarity group meta-data (162A-162Q) may specify meta-data associated with a similarity group. The meta-data of each similarity group may specify a sketch and a number of fingerprints. The sketch may be used to match slices of data to the similarity group. The fingerprints may be used to determine whether a segment of a slice of data that mapped to a similarity group is already present in the object storage.

Figure 2B:
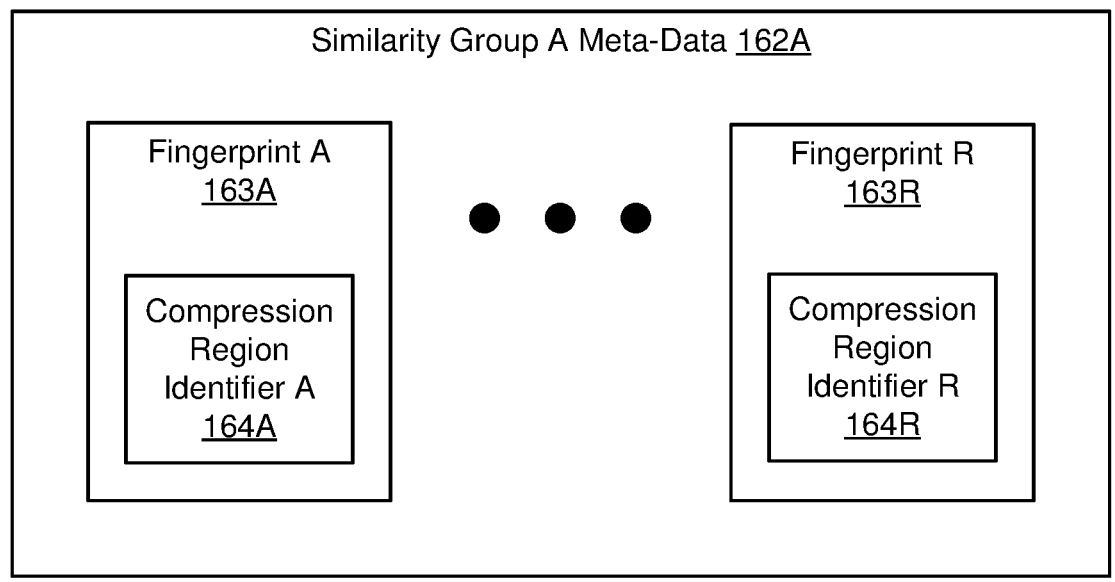
FIG. 2B shows a diagram of a similarity group meta-data entry in accordance with one or more embodiments of the invention.

FIG. 2B shows an example of a similarity group A meta-data (162A). The similarity group A meta-data (162A) includes a sketch (163) and a number of fingerprints (164A-164R).

In one or more embodiments of the invention, a sketch may be a bit sequence that does not uniquely identify a slice. Rather, the sketch may be a bit sequence that identifies a group of slices that each include similar but unique data or include identical data. In other words, the sketch of multiple, different slices may be the same bit sequence if each slice includes similar but different data or includes identical data.

In one or more embodiments of the invention, a fingerprint may be a bit sequence that virtually uniquely identifies a segment of a slice. As used herein, virtually uniquely means that the probability of collision between each fingerprint of two segments that specify different data is negligible, compared to the probability of other unavoidable causes of fatal errors. In one or more embodiments of the invention, the probability is $10^{-20}$ or less. In one or more embodiments of the invention, the unavoidable fatal error may be caused by a force of nature such as, for example, a tornado. In other words, the fingerprint of any two segments that specify different data will virtually always be different.

Each fingerprint (164A-164R) of the similarity group A meta-data (162A) may include a compression region identifier (165A-165R). The compression region identifier (165A-165R) may specify a compression region where a segment of a slice having the same fingerprint as specified by the fingerprint (164A-164R) is stored. In other words, each fingerprint (164A-164R) may specify where a segment having the fingerprint specified by the fingerprint (164A-164R) is stored.

While the similarity group meta-data has been illustrated as only including a sketch (163) and fingerprints (164A-164R), the similarity group meta-data may include other data without departing from the invention. For example, the similarity group may specify a length of a compression region, an offset from the start of a compression region, a bit sequence, a name, or other types of data without departing from the invention.

Returning to FIG. 2A, while the object storage (160) has been illustrated as only including compression regions and similarity group meta-data, other types of data may also be stored in the object storage (160) without departing from the invention. For example, the object storage (160) may include the slice recipe storage (170), the object recipe storage (180), meta-data associated with each compression region, or other types of data. The meta-data associated with each compression region may specify segment boundaries between multiple segments that are stored in each compression region, keys to portions of the compression region, or other data that may identify or specify portions of a compression region.

Figure 2C:
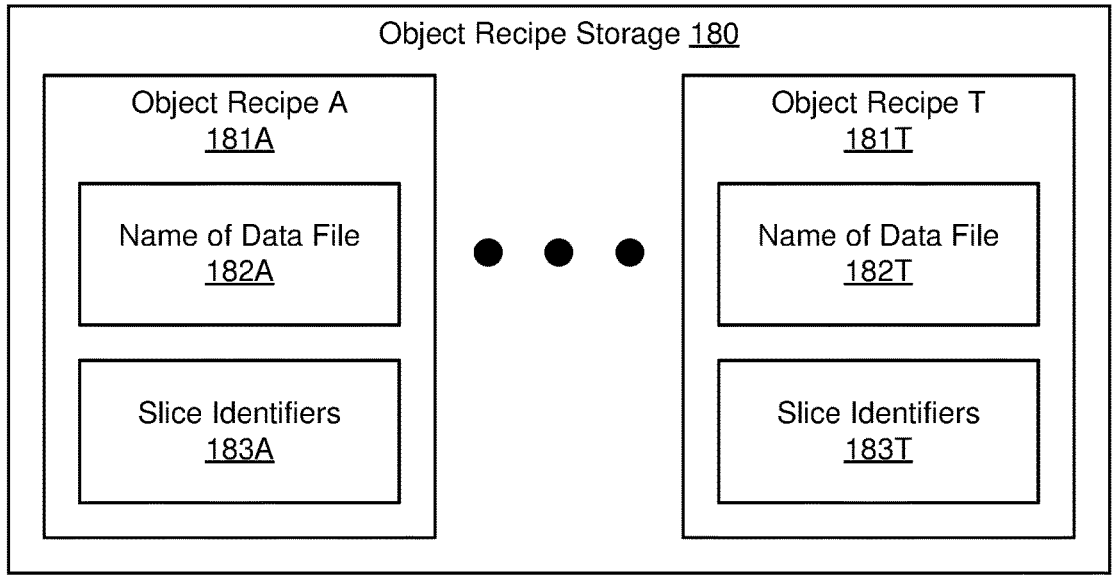
FIG. 2C shows a diagram of an object recipe storage in accordance with one or more embodiments of the invention.
Figure 2D:
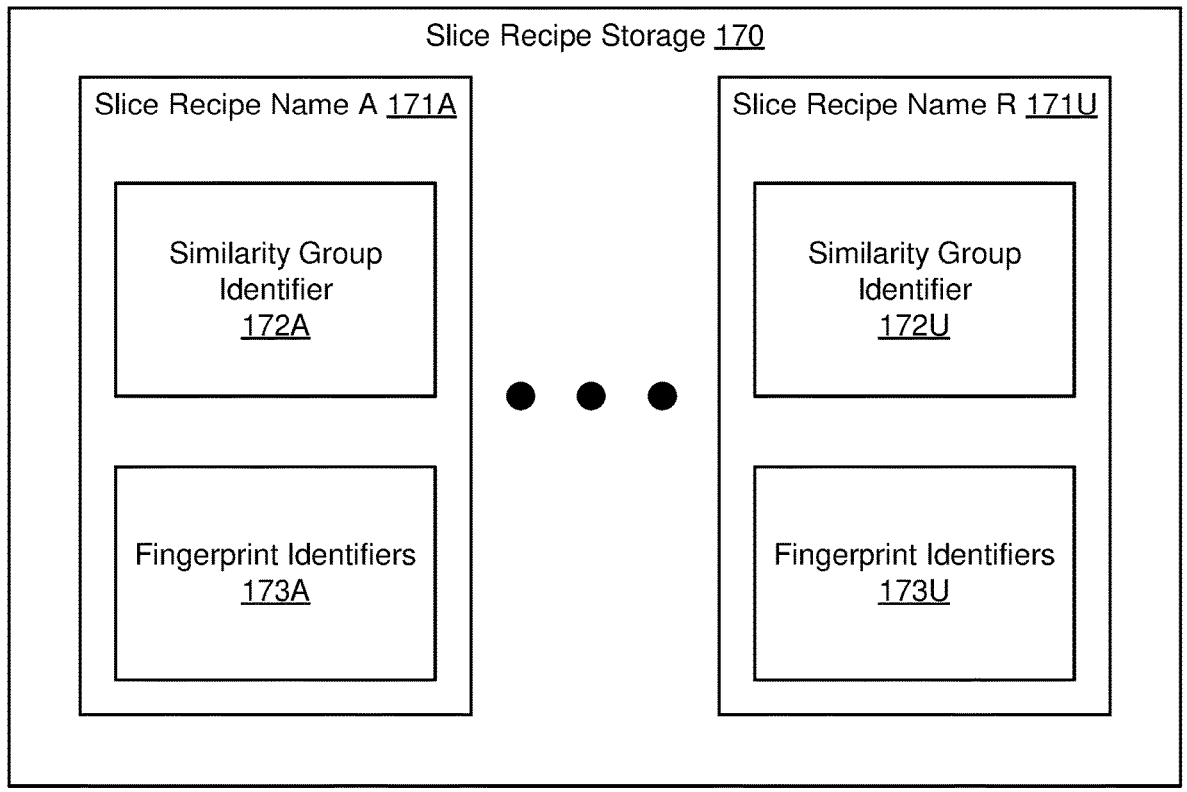
FIG. 2D shows a diagram of a slice recipe storage in accordance with one or more embodiments of the invention.

FIG. 2D shows a slice recipe storage (170) in accordance with one or more embodiments of the invention. The slice recipe storage (170) may include a number of slice recipes (171A-171U) that include data that may be used to reconstruct a slice of data. Each slice recipe (171A-171U) may include a similarity group identifier (172A-172U) and fingerprint identifiers (173A-173U).

The slice recipe may have a name, i.e., slice recipe name A, that uniquely identifies the slice of data. Slice recipes may be generated as part of the method of storing the data in the object storage shown in FIG. 4.

The similarity group identifier (172A-172U) may specify a similarity group and the corresponding meta-data (162A-162Q, FIG. 2A) of the similarity group. The similarity group identifier (172A-172U) may be, for example, a key, bit sequence, or other data that enables the corresponding meta-data to be obtained.

The fingerprint identifiers (173A-173U) may specify one or more fingerprints (164A-164R) of the similarity group meta-data that corresponds to the similarity group specified by the similarity group identifier (172A-172U). The fingerprint identifiers (173A-173U) may be, for example, one or more keys, bit sequences, or other data that enables the one or more fingerprints (164A-164R, FIG. 2B) of the similarity group meta-data to be obtained. Obtaining the one or more fingerprints (164A-164R, FIG. 2B) may enable segments of the slice stored in compression regions specified by the compression region identifier (165A-165R, FIG. 2B) to be obtained.

While the slice recipes (171A-171U) have been illustrated as only including a similarity group identifier (172A-172U) and fingerprint identifiers (173A-173U), the slice recipes (171A-171U) may include other data without departing from the invention.

FIG. 2C shows an object recipe storage (180) in accordance with one or more embodiments of the invention. The object recipe storage (180) may include a number of object recipes (181A-181T) that include data that may be used to reconstruct a data object. The data object may be, for example, a data file or a portion of a data file that has been previously stored in the object storage (160, FIG. 2A). Each object recipe (181A-181T) may include a name of an object (182A-182T) and slice identifiers (183A-183T). Object recipes may be generated as part of the method of storing the data in the object storage shown in FIG. 4.

The name of an object (182A-182T) of each object recipe (181A-181T) may be a name of a data object stored in the object storage. The name of the object (182A-182T) may be used to identify the object recipe (181A-181T) when an entity requests to read a data stored in the object storage by the method of reading data shown in FIG. 6.

The slice identifiers (183A-183T) may specify one or more slice recipes (171A-171U) stored in the slice recipe storage (170). The slice recipe identifiers (183A-183T) may be passed to the backend micro-services as part of the method of reading data shown in FIG. 6 to obtain each of the slices of data corresponding to each of the slice recipes. The slice identifiers (183A-183U) may be, for example, one or more keys, bit sequences, or other data that enables the backend micro-services to obtain a corresponding slice recipe.

While the object recipes (181A-181U) have been illustrated as only including a name of an object (182A-182U) and slice identifiers (183A-183U), the object recipes (181A-181U) may include other data without departing from the invention.

Figure 3A:
FIG. 3A shows a diagram of data in accordance with one or more embodiments of the invention.
Figure 3B:
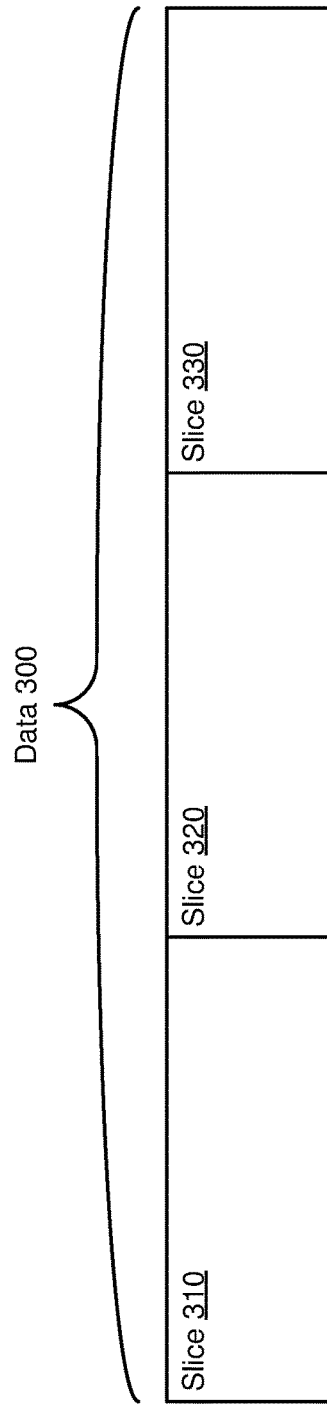
FIG. 3B shows a diagram of slices of the data of FIG. 3A in accordance with one or more embodiments of the invention.

FIGS. 3A-3B show diagrams that illustrate relationships between data (300), slices (310, 320, 330) of the data (300), and segments (311, 312, 313) of a slice (310) of the data (300), respectively. The data (300) may divided into segments and slices as part of the method shown in FIG. 4.

FIG. 3A shows a diagram of data (300) in accordance with one or more embodiments of the invention. The data may be any type of data in any format and of any length.

FIG. 3B shows a diagram of slices (310, 320, 330) of the data (300). Each slice of the data may include separate, distinct portions of the data (300). Each of the slices may be of different, but similar lengths. For example, each slice may include approximately 8 megabytes of data, e.g., a first slice may include 8.05 megabytes of data, the second slice may include 7.93 megabytes of data, etc. In one or more embodiments of the invention, the average amount of data of each slice is between 4 and 16 megabytes.

Figure 3C:
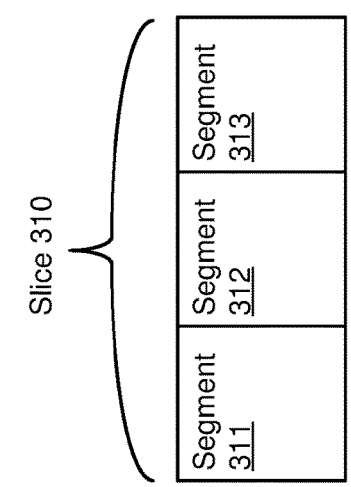
FIG. 3C shows a diagram of segments of a slice of FIG. 3B in accordance with one or more embodiments of the invention.

FIG. 3C shows a diagram of segments (311, 312, 313) of a slice (310) of the data (300). Each segment may include separate, distinct portions of the slice (310). Each of the segments may be of different, but similar lengths. For example, each segments may include approximately 8 kilobytes of data, e.g., a first segment may include 8.03 kilobytes of data, the second segment may include 7.96 kilobytes of data, etc. In one or more embodiments of the invention, the average amount of data of each segment is between 4 and 16 kilobytes.

FIGS. 4-8 show flowcharts in accordance with one or more embodiments of the technology. The methods shown in FIGS. 4 and 5 may facilitate storing data in the object storage while the methods shown in FIGS. 6-7 may facilitate reading stored data from the object storage. The method shown in FIG. 8 may facilitate both reading and storing of data in the object storage by adjusting computing resources dedicated to the reading and/or writing of data to the object storage. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

Figure 4:
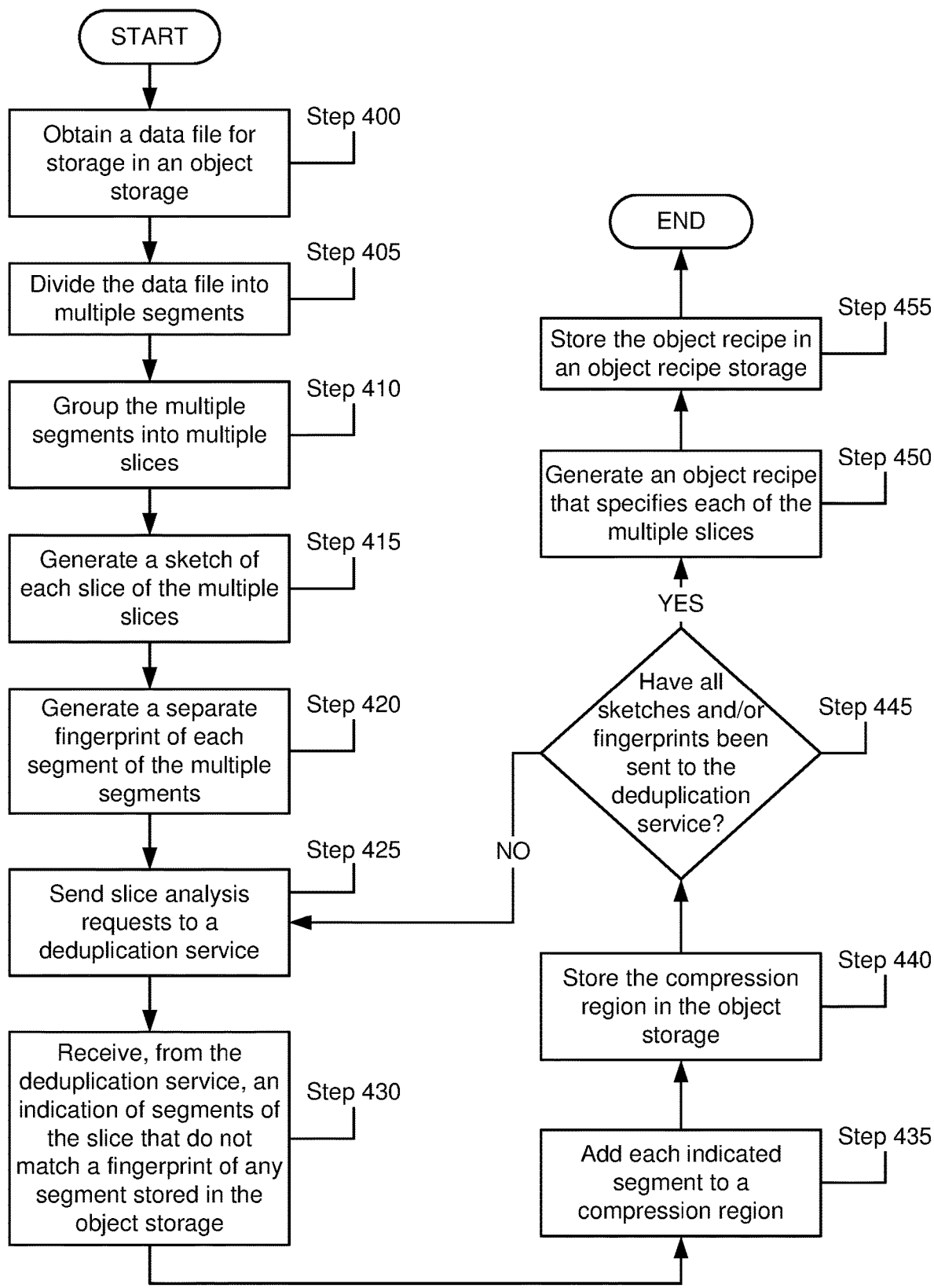
FIG. 4 shows a flowchart of a method of storing data in an object storage in accordance with one or more embodiments of the invention.

FIG. 4 shows a flowchart according to one or more embodiments of the invention. The method depicted in FIG. 4 may be used to store data in an object storage in accordance with one or more embodiments of the invention. The method shown in FIG. 4 may be performed by, for example, a frontend micro-service of a client (100, 101, FIG. 1).

In Step 400, a frontend micro-service may obtain a data file, or a portion thereof, for storage in an object storage. The data file may be provided to the frontend micro-service by a client.

In one or more embodiments of the invention, an application executing on the client may include the frontend micro-service as a plugin module and provides the data file to the frontend micro-service directly.

In one or more embodiments of the invention, the data file may be received by a load balancer. The load balancer may added the data file to a queue of data files to be stored in the object storage. The load balancer may provide the data file to a frontend micro-service once the data file reaches the head of the queue.

In one or more embodiments of the invention, the data file may be streamed to the frontend micro-service. In other words, portions of the data file or a data stream may be sent to the frontend micro-service overtime. The load balancer may assign a frontend micro-service of the client to receive the streamed data file or data stream and perform one or more of the other steps of the process shown in FIG. 4 on portions of the streamed data as it is streamed.

In Step 405, the frontend micro-service may divide the data file into multiple segments. The segments may be non-overlapping portions of the data file each having approximately the same length as described with respect to FIG. 3C.

In one or more embodiments of the invention, the data file may be divided into segments by generating a rolling hash of the data file. A rolling hash may be successive hashes of a window as the window moves through the data file. For example, a first hash of the rolling has may be a hash of 64 bytes of data starting at the first byte of the data file, a second hash of the rolling has may be a hash of 64 bytes of data starting at the second byte of the data file, a third hash of the rolling has may be a hash of 64 bytes of data starting at the third byte of the data file, etc.

A number of segment breakpoints may then be selected by comparing each hash, or a portion thereof, of the rolling hash to a predetermined bit sequence. The starting byte of each hash that matches the predetermined bit pattern may be selected as a segment breakpoint. The location of each selected starting byte may be used as the segment breakpoints. In one or more embodiments of the invention, the predetermined bit sequence may consist of 13 bits.

The segments of the data file may be generated by dividing the data file into portions based on the locations specified by the segment breakpoints. For example, a first segment may begin at the start of the data file and end at the location specified by the first segment break point, a second segment may begin at the location specified by the first segment break point and end at the location specified by the second segment breakpoint, a third segment may begin at the location specified by the second segment break point and end at the location specified by the third segment breakpoint, etc.

In Step 410, the frontend micro-service may group multiple segments into multiple slices. The slices may be non-overlapping portions of the data file each having approximately the same length as described with respect to FIG. 3B.

In one or more embodiments of the invention, the segments may be grouped into slices using the rolling hash of Step 405

A number of slice breakpoints may be selected by comparing each hash, or a portion thereof, of the rolling hash to a second predetermined bit sequence. The starting byte of each hash that matches the second predetermined bit pattern may be selected as a slice breakpoint. The location of each selected starting byte may be used as the slice breakpoints. In one or more embodiments of the invention, the second predetermined bit sequence may consist of 23 bits.

The slices of the data file may be generated by aggregating the segments based on the locations specified by the slice breakpoints. For example, a first slice may be generated by aggregating the segments that have locations between the start of the data file and the location specified by the first slice break point, a second slice may be generated by aggregating the segments between the location of the first slice break point and the location of the second slice break point, a third slice may be generated by aggregating all of the segments between the location of the second slice break point and the location of the third slice breakpoint, etc.

In Step 415, the frontend micro-service may generate a sketch of each slice of Step 410. The sketch of each slice may be a sketch as describe with respect to FIG. 2B. The sketch may be obtained by generating a weak hash of the slice.

In one or more embodiments of the invention, the weak hash may include multiple maximal and/or minimal hash values obtained by performing rolling hash functions over the data of the slice. For example, four rolling hash functions may be performed over the data of the slice and maximal hash value seen for each of the four rolling hash functions may be aggregated. A hash of the aggregated hash values may be generated to obtain a single hash. The single hash may be used as the sketch of the slice.

In one or more embodiments of the invention, the sketch is a bit sequence that matches sketches of other slices, already stored in the object storage, that have similar or identical data.

In Step 420, the frontend micro-service may generate a fingerprint of each segment of each slice of Step 410. The fingerprint of each segment may be a fingerprint as describe with respect to FIG. 2B.

In one or more embodiments of the invention, the fingerprint is a bit sequence that matches fingerprints of other segments that have virtually identical data.

Each fingerprint may be a bit sequence as described with respect to FIG. 2A. In one or more embodiments of the invention, segment boundaries of each fingerprint of each segment of the slice, or a portion thereof, may be generated using Rabin's fingerprinting algorithm. In one or more embodiments of the invention, each fingerprint of each segment of the slice may be generated using a cryptographic hash function. The cryptographic hash function may be, for example, a message digest (MD) algorithm or a secure hash algorithm (SHA). The message MD algorithm may be MD5. The SHA may be SHA-0, SHA-1, SHA-2, or SHA3. Other fingerprinting algorithms may be used without departing from the invention.

In Step 425, the frontend micro-service may send a slice analysis requests to the backend micro-services. A slice analysis request may specify the sketch of a slice and the fingerprints of each segment of the slice. The frontend micro-service may send separate slice analysis requests corresponding to each slice of step 410 until slice analysis requests have been sent for each slice. For example, as will be discussed in Step 445, step 425 may be repeated until all of the sketches and/or fingerprints of steps 415 and/or 420 have been sent to the backend micro-services as part of slice analysis requests. In one or more embodiments of the invention, the slices and/or segments are not sent to the backend micro-services.

In one or more embodiments of the invention, the frontend micro-service may send each slice analysis request by sending the request into a request queue that queues each of the requests and/or load balances each of the requests across the one or more backend micro-services.

For example, each of the slice analysis requests may be sequentially loaded into a request queue. The request queue may then provide a slice analysis requests to a backend micro-service when the micro-service indicates that it is available for processing. The request queue may then provide a second slice analysis requests to a second backend micro-service when the second micro-service indicates that it is available for processing. The process may be repeated until all of the slice analysis requests have been provided to backend micro-services. The request queue may send multiple of the slice analysis requests to the same backend micro-service without departing from the invention.

In Step 430, the frontend micro-service may receive an indication of segments of a slice that are not present in the object storage. The indication may be, for example, a list of fingerprints of segments of the slice.

In Step 435, the frontend micro-service may add the indicated segments of Step 430 to one or more compression regions.

In Step 440, the frontend micro-service may store the one or more compression regions in the object storage.

In Step 445, the method may to proceed to step 425 if any of the sketches and/or fingerprints of steps 415 and/or 420 have not been sent to the backend micro-services as part of a slice analysis request. Thus, Steps 425-440 may be repeated for each slice or the steps may be performed in parallel for each slice. The method may proceed to step 450 if all of the sketches have been sent to the backend micro-services as part of one or more slice analysis requests.

In Step 450, the frontend micro-service may generate an object recipe. The object recipe may specify the data shown in, for example, the object recipe A (181A) of FIG. 2C. The recipe may include the name of the object, i.e., the name of the data file that a client will use to reference the data file, and one or more slice identifiers, i.e., data used to identify the slices that make up the data file.

The name of the object may be generated based on a name of the data file provided by the client. In one or more embodiments of the invention, the clients and the frontend micro-services may implement a predetermined naming convention for data files that are stored in the object storage Each of the slice identifiers may be generated based on a predetermined naming convention between the frontend micro-services and the backend micro-services. For example, the first slice of a data file may be the name of the data file with a slice number, reflecting the relative location of the slice within the data file, appended to the name of the data file.

The slice identifiers may be generated using other methods without departing from the invention. For example, a slice may be given an arbitrary identifier by a frontend micro-service and the slice identifier may be sent to the backend micro-services along with the slice to ensure consistent naming and identification of slices between the frontend micro-services and the backend micro-services.

In Step 455, the frontend micro-service stores the object recipe in an object storage. The object storage may be a storage as illustrated in FIG. 2C. The object storage may be a persistent storage.

Figure 5:
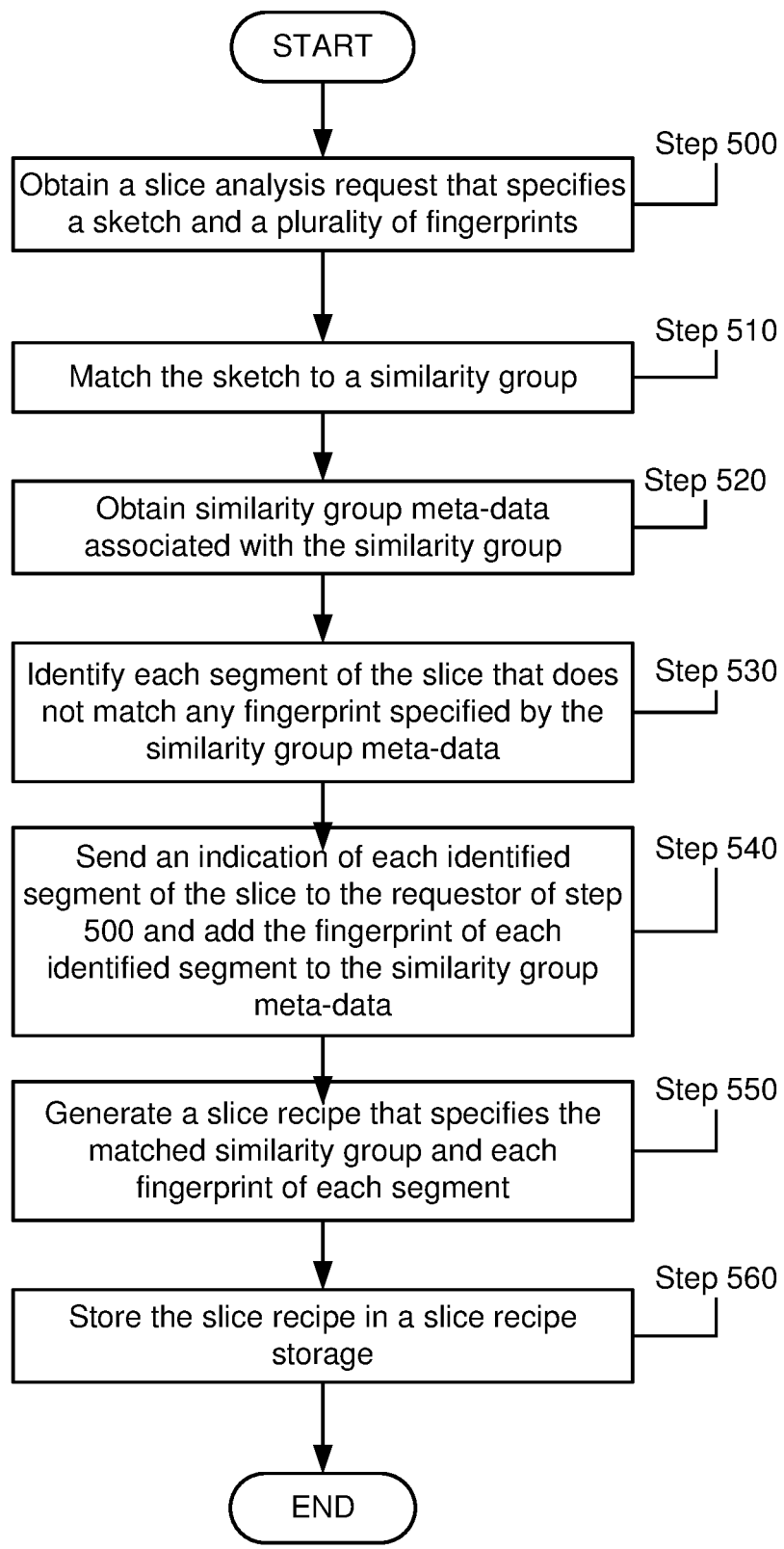
FIG. 5 shows a flowchart of a second method of storing data in an object storage in accordance with one or more embodiments of the invention.

FIG. 5 shows a flowchart according to one or more embodiments of the invention. The method depicted in FIG. 5 may be used to store data in an object storage in accordance with one or more embodiments of the invention. The method shown in FIG. 5 may be performed by, for example, a backend micro-service of the deduplication service (110, FIG. 1).

In Step 500, a backend micro-service may obtain a slice analysis request. The slice analysis request may include a sketch of a slice of a data file and a plurality of fingerprints of the segments of the slice from a frontend micro-service of a client. In one or more embodiments of the invention, the slice data of the data file is not obtained by the backend micro-service. Only sending the sketch and fingerprints, rather than the slice data and segment data themselves, may reduce the total quantity of data transmitted between the frontend micro-services and the backend micro-services to facilitate storage of data in the object storage.

In one or more embodiments of the invention, the slice analysis request may be obtained from a message queue that load balances slice analysis requests and/or requests to read slices from the object storage across multiple backend micro-services of the deduplication service. In one or more embodiments of the invention, the slice analysis request may be obtained by notifying the messaging queue that the backend micro-service is available to process additional requests. In one or more embodiments of the invention, the backend micro-service may read the slice analysis request from the message queue and notify the message manager and/or the message queue that the slice analysis request has been read and/or is being processed by the backend micro-service.

In Step 510, the backend micro-service may match the sketch specified by the slice analysis request of Step 500 to a sketch specified by one of the similarity group meta-data stored in the object storage (160, FIG. 2A). The sketch may be matched by sequentially comparing the bit sequence of the sketch to the bit sequence of each sketch of each similarity group meta-data stored in the object storage until an identical bit sequence is found.

In one or more embodiments of the invention, a new similarity group meta-data entry is generated and stored in the object storage if the sketch of the slice does not match a sketch of any similarity group meta-data that is already stored in object storage.

In Step 520, the backend micro-service obtains meta-data associated with the similarity group that was matched in step 510. The similarity group-meta data may specify a plurality of fingerprints of segments that are stored in the object storage. The backend micro-service may obtain the meta-data and the fingerprints by extracting the both from the object storage and loading them into a memory of a cloud platform, or other computing device, on which the backend micro-service is executing.

In Step 530, the backend micro-service compares each fingerprint specified in the slice analysis request of Step 500 to each fingerprint obtained in Step 520 to identify segments of the slice that are not stored in the object storage. For each fingerprint specified by the analysis request that does not match any of the obtained fingerprints, the corresponding segment may be identified as not present in the object storage.

In Step 540, the backend micro-service may send an indication of each identified segment of the slice of Step 530 to the client. The matched similarity group meta-data of step 520 may be updated.

Updating the similarity group meta-data may include adding new fingerprints, based on each finger print that was not matched, that specify the compression region identifier of the compression region in which the segment, corresponding to the fingerprint, will be stored.

In one or more embodiments of the invention, the frontend micro-services and the backend micro-services may utilize a predetermined convention for storage of segments in compression regions so that the backend micro-services may determine where the segments will be stored before the segments are actually added to a compression regions and/or stored in the object storage. The similarity group meta-data be updated by adding, modifying, or deleting other data from the similarity group meta-data without departing from the invention. In other embodiments of the invention, a predetermined naming convention may not be used.

In Step 550, the backend micro-service may generate a slice recipe that specifies an identifier of the matched similarity group of Step 510 and each fingerprint, associated with a corresponding compression region of the object storage, specified by the slice analysis request of Step 500. The slice recipe may be a slice recipe as illustrated in FIG. 2D.

In Step 560, the backend micro-service may store the slice recipe in a slice recipe storage. The slice recipe storage may be a storage as illustrated in FIG. 2D and may be stored on a persistent storage.

Figure 6:
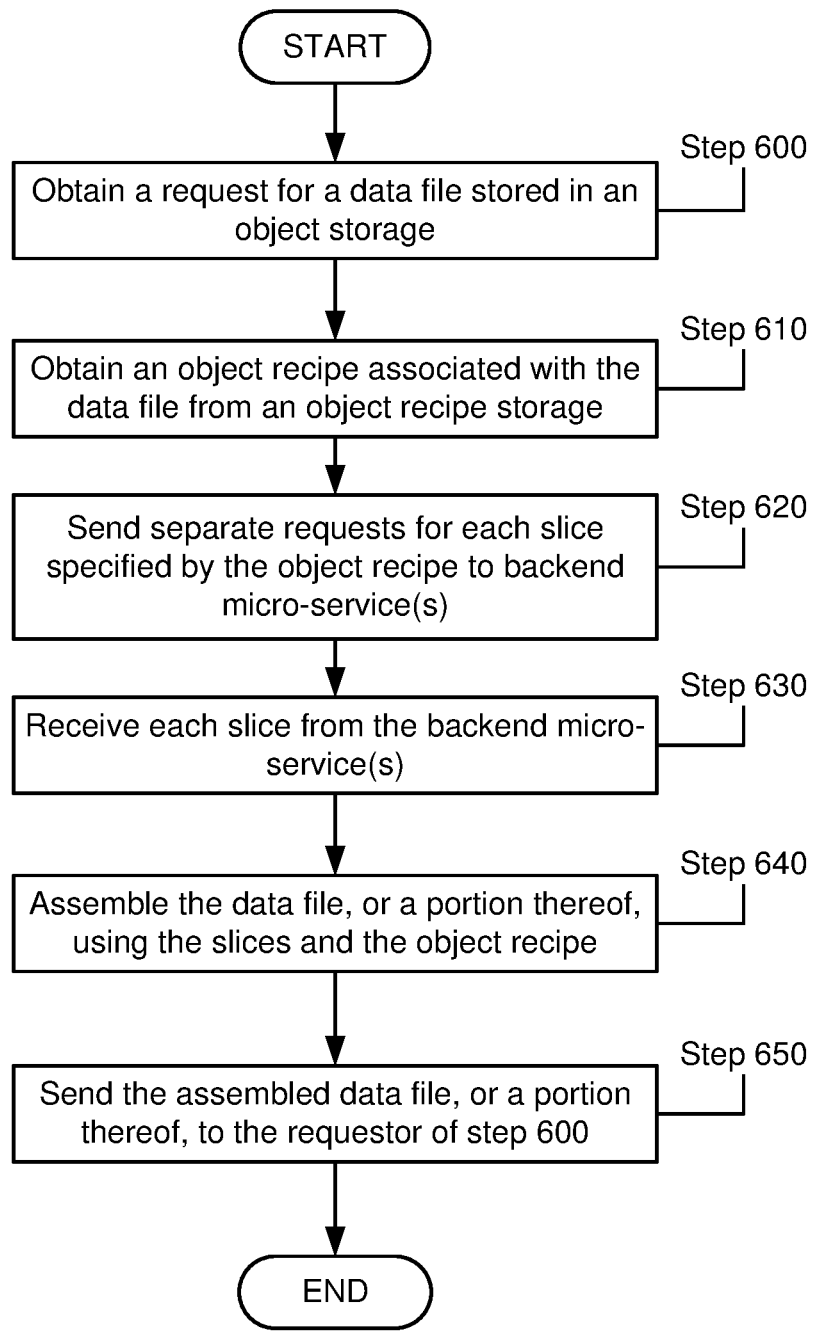
FIG. 6 shows a flowchart of a method of reading data stored in an object storage in accordance with one or more embodiments of the invention.

In one or more embodiments of the invention, the slice recipe name or identifier may be set based on a predetermined naming convention. A predetermined naming convention may enable the frontend and backend micro-services to read data stored in the object storage. In other embodiments of the invention, one of the backend or frontend micro-services may select a name or identifier for a slice recipe and notify a corresponding backend or frontend micro-services of the selected name or identifier for the slice recipe so that the frontend and backend micro-services may cooperate to read the data stored in the object storage FIG. 6 shows a flowchart according to one or more embodiments of the invention. The method depicted in FIG. 6 may be used to obtain data from an object storage in accordance with one or more embodiments of the invention. The method shown in FIG. 6 may be performed by, for example, a frontend micro-service of the deduplication service (110, FIG. 1).

In Step 600, a frontend micro-service may obtain a request for a data file stored in an object storage from an entity. The request may be obtained from a load balancer that distributes requests from clients to the frontend micro-service.

In Step 610, the frontend micro-service may obtain an object recipe specified by the request. The object recipe may be an object recipe as illustrated in FIG. 2C.

In Step 620, the frontend micro-service may send requests for each slice specified by the object recipe to one or more backend micro-services. The slice requests may be sent to the backend micro-services via a message manager that queues the requests and, when a backend micro-service is available, distributes the requests to backend micro-services.

In Step 630, the frontend micro-service may receive each slice specified by the object recipe from the one or more backend micro-services. The slices may be received via the message manager via a queue.

In Step 640, the frontend micro-service assembles a data file, or a portion thereof, using the slices obtained in Step 630 and the object recipe obtained in Step 600. The data file may be assembled by appending each of the slices in an order specified by the object recipe.

In Step 650, the frontend micro-service sends the assembled data file to the entity that requested the data file.

Figure 7:
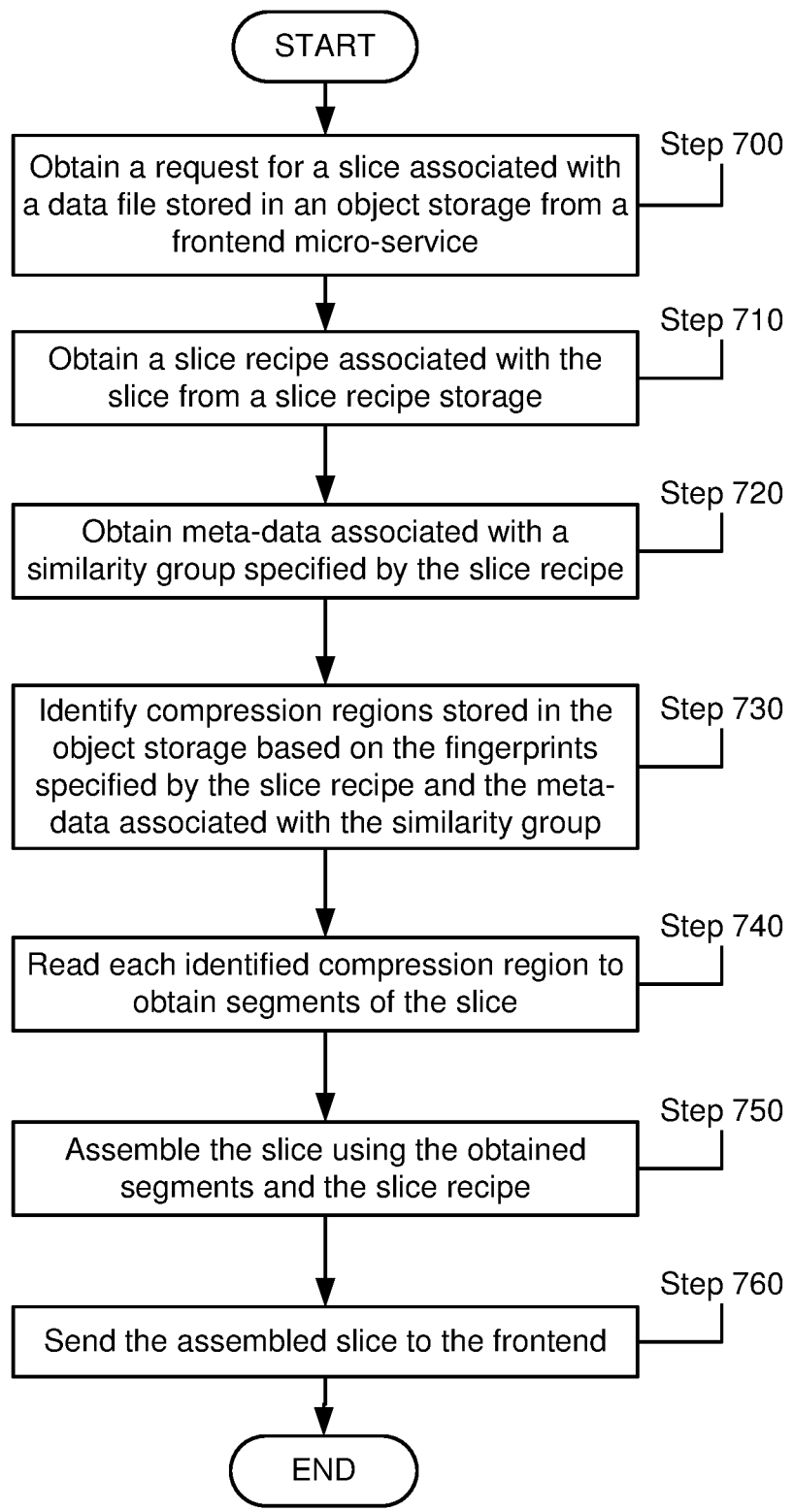
FIG. 7 shows a flowchart of a second method of reading data stored in an object storage in accordance with one or more embodiments of the invention.

FIG. 7 shows a flowchart according to one or more embodiments of the invention. The method depicted in FIG. 7 may be used to obtain data stored in an object storage in accordance with one or more embodiments of the invention. The method shown in FIG. 7 may be performed by, for example, a backend micro-service of the deduplication service (110, FIG. 1).

In Step 700, a backend micro-service may obtain a request for a slice of a data file. The request for the slice may be obtained from a message queue that load balances requests to store slices in the object storage and requests to read slices from the object storage across multiple backend micro-services of the deduplication service. In one or more embodiments of the invention, the request for the slice may be obtained by notifying the messaging queue that the backend micro-service is available to process additional requests. The message queue may provide the backend micro-service with the request in response to the notification. In one or more embodiments of the invention, the backend micro-service may read the request for the slice from the message queue and notify the message manager and/or the message queue that the request for the slice has been read and/or is being processed by the backend micro-service.

In Step 710, the backend micro-service may obtain a slice recipe associated with the slice from a slice recipe storage. The slice recipe may be a slice recipe as illustrated in FIG. 2D. The slice recipe may be obtained by matching a name of the slice or data included in the request to a slice recipe name of a slice recipe stored in the slice recipe storage. The slice recipe may be obtained by reading the matched slice recipe from the slice recipe storage.

In Step 720, the backend micro-service may obtain similarity group meta-data specified by the slice recipe using a similarity group meta-data identified specified by the slice recipe of step 710.

In Step 730, the backend micro-service may identify compression regions stored in the object storage and specified by the obtained similarity group meta-data.

In Step 740, the backend micro-service may read each of the identified compression regions of step 730 from the object storage to obtain segments of the slice.

In Step 750, the backend micro-service may assemble the slice using the obtained segments of the slice and the slice recipe.

In Step 760, the backend micro-service may send the assembled slice to the frontend micro-service that requested the slice.

Figure 8:
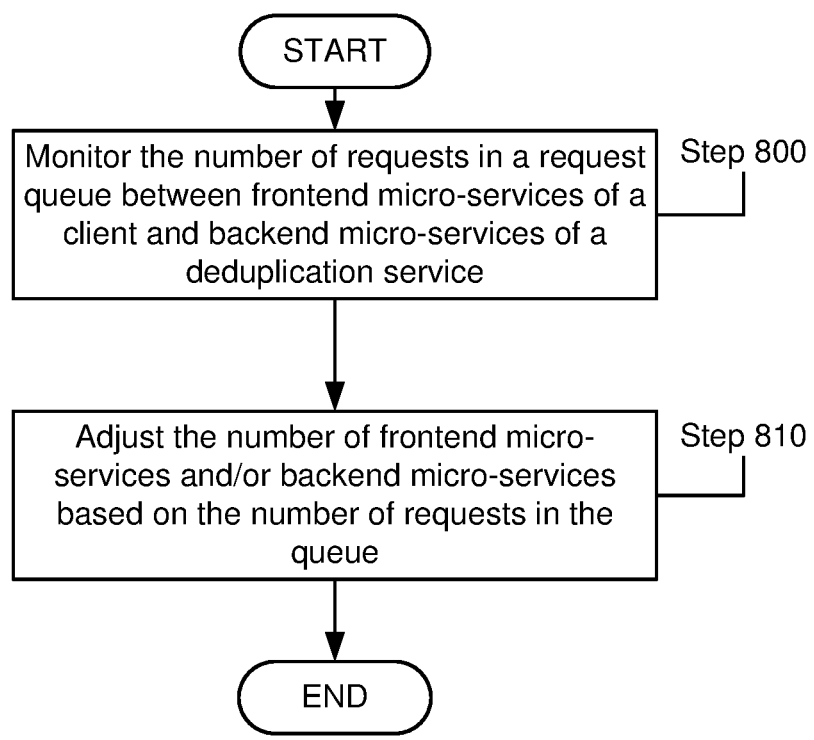
FIG. 8 shows a flowchart of a method of adjusting the quantity of computing resources assigned to frontend micro-services and/or backend micro-services in accordance with one or more embodiments of the invention.

FIG. 8 shows a flowchart in accordance with one or more embodiments of the invention. The method depicted in FIG. 8 may be used to modify the quantity of resources dedicated to managing data of an object storage in accordance with one or more embodiments of the invention. The method shown in FIG. 8 may be performed by, for example, a deduplication service (110, FIG. 1).

In Step 800, the number of requests in a request queue between a number of front end micro-services and a number of backend micro-services may be monitored.

In Step 810, the number of frontend micro-services and/or backend micro-services may be adjusted. In other words, new instances of micro-services may be added or executing instances of micro-services may be terminated.

In one or more embodiments of the invention, new instances of backend micro-services may be added if the number of requests in the request queue exceeds a predetermined number. In other words, new instances of backend micro-services may be added if the rate of request processing of the currently executing backend micro-services is less than a rate of requests being added to the queue.

In one or more embodiments of the invention, currently executing instances of backend micro-services may be terminated if the number of requests in the request queue is less than a predetermined number. In other words, currently executing instances of backend micro-services may be terminated if the rate of request processing capacity of the currently executing backend micro-services is greater than a rate of requests being added to the queue.

In one or more embodiments of the invention, new instances of frontend micro-services may be added if the number of requests in the request queue is less than a predetermined number. In other words, new instances of frontend micro-services may be added if the rate of request processing of the currently executing backend micro-services is greater than a rate of requests being added to the queue.

In one or more embodiments of the invention, currently executing instances of frontend micro-services may be terminated if the number of requests in the request queue greater than a predetermined number. In other words, currently executing instances of frontend micro-services may be terminated if the rate of request processing capacity of the currently executing backend micro-services is less than a rate of requests being added to the queue.

One or more embodiments of the invention may enable one or more of the following: i) separation of preparation of data files for deduplication and deduplication of the prepared files into frontend and backend micro-services, respectively, ii) distribution of the frontend micro-services and the backend micro-services to a client and a deduplication service, respectively, iii) dynamic adjustments of computing resources used for preparation of files for deduplication or deduplication of prepared files by adding new instances of micro-services and/or terminating existing instances of micro-services, iv) scaling of deduplication of data across an arbitrary number of computing resources, v) reducing the computing resource used for deduplicating data for storage in an object storage by only loading a subset of all of the fingerprints of every segment stored in an object storage by performing similarity group mapping, and vi) reducing the network bandwidth used for deduplicating data for storage in an object storage by only sending sketch and/or fingerprints of data to identify whether portions of the data is already stored in the object storage.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A system for managing an object storage, comprising:
a plurality of frontend micro-services programmed to:
obtain a request to store data in an object storage;
divide the data into slices;
send a slice analysis request, based on a slice of the slices, to a plurality of backend micro-services, wherein the slice analysis request comprises:
a sketch of the slice that does not uniquely identify the slice, and
a fingerprint of each segment of the slice that virtually uniquely identifies the respective segment;
obtain, from the plurality of backend micro-services, a list of segments of the slice that are not stored in the object storage;
add a segment specified by the list of segments to a compression region;
the plurality of backend micro-services programmed to:
identify segments of the slice specified by the slice analysis request that are not stored in the object storage using the sketch of the slice and the fingerprints; and
generate the list of segments of the slice based on the identified segments;
a load balancer programmed to:
obtain requests to store data in the object storage; and
distribute the requests to the plurality of frontend micro-services,
wherein the system dynamically adjusts a number of available frontend micro-services based on a number of pending requests in the load balancer.

2. The system of claim 1, further comprising:
a request queue that passes slice analysis requests from the frontend micro-services to the backend micro-services,
wherein the system dynamically adjusts a number of available backend micro-services based on a number of pending slice analysis requests in the request queue.

3. The system of claim 1, wherein the plurality of frontend micro-services is further programmed to:
store the compression region in the object storage,
wherein the object storage is a persistent storage.

4. The system of claim 1, wherein the request to store data in the object storage is received from a computing device.

5. The system of claim 4, wherein the plurality of backend micro-services executes on a cloud platform operably connected to the computing device.

6. The system of claim 5, wherein the plurality of frontend micro-services does not execute on the cloud platform.

7. A method of managing an object storage, comprising:
obtaining, by a frontend micro-service, a request to store data in an object storage;
dividing, by the frontend micro-service, the data into slices;
sending, by the frontend micro-service, a slice analysis request to a plurality of backend micro-services, wherein the slice analysis request comprises:
a sketch of the slice that does not uniquely identify the slice, and
a fingerprint of each segment of the slice that virtually uniquely identifies the respective segment;
obtaining, by the frontend micro-service, a list of segments of the slice of the slices that are not stored in the object storage; and
adding, by the frontend micro-service, a segment specified by the list of segments to a compression region.

8. The method of claim 7, wherein dividing the data into slices comprises:
dividing a portion of the data into a plurality of segments;
grouping a portion of the segments of the plurality of segments into the slice;
generating an object recipe that specifies, in part, the slice; and
storing the object recipe in an object recipe storage.

9. The method of claim 8, wherein dividing the portion of the data into the plurality of segments comprises:
generating a rolling hash of the data;
obtaining a plurality of segment break points by comparing each hash of the rolling hash to a predetermined bit pattern; and
dividing the portion of the data based on the plurality of segment break points.

10. The method of claim 9, wherein grouping the portion of the segments of the plurality of segments into the slice comprises:
determining a plurality of slice break points by comparing each hash of the rolling hash to a second predetermined bit pattern;
identifying the portion of the segments of the plurality of segments based on plurality of slice break points; and
grouping the segments of the identified portion of the segments of the plurality of segments into the slice,
wherein the second predetermined bit pattern has a length that is longer than a length of the predetermined bit pattern.

11. The method of claim 7, further comprising:
storing, by the frontend micro-service, the compression region in the object storage,
wherein the object storage is a persistent storage.

12. The method of claim 7, wherein the request to store data in the object storage is received from a computing device, wherein a plurality of frontend micro-services execute on the computing device, wherein the plurality of backend micro-services are not executing on the computing device.

13. The method of claim 8, wherein the data is not sent to the plurality of backend micro-services.

14. A method of managing an object storage, comprising:
obtaining, by a backend micro-service, a slice analysis request, wherein the slice analysis request comprises:

a sketch of the slice of data that does not uniquely identify the slice, and
a fingerprint of each segment of a plurality of segments of the slice that virtually uniquely identifies the respective segment;

identifying, by the backend micro-service, segments of the plurality of segments that are not stored in the object storage using the sketch of the slice of the data and the fingerprint of each segment of the plurality of segments of the slice;

generating, by the backend micro-service, a list of segments that specifies each segment of the identified segments;

sending, by the backend micro-service, the list of segments to a client that sent the slice analysis request;

monitoring, by a system comprising a plurality of backend micro-services, a cardinality of pending slice analysis requests in a request queue that provides the slice analysis request to a plurality of backend micro-services including the backend micro-service; and dynamically adjusting, by the system, a cardinality of the plurality of backend micro-services based on the monitoring of the cardinality of the pending slice analysis requests in the request queue.

15. The method of claim 14, wherein identifying a first set of segments of the plurality of segments that are not stored in the object storage and a second set of segments of the plurality of segments that are stored in the object storage comprises:

matching the sketch of the slice to a similarity group of a plurality of similarity groups, wherein each similarity group of the plurality of similarity groups has a different sketch;

obtain meta-data, associated with the matched similarity group, that specifies a plurality of fingerprints stored in the object storage; and identifying fingerprints, specified by the slice analysis request, that do not match any of the fingerprints of the plurality of fingerprint specified by the meta-data.

16. The method of claim 15, further comprising:
adding each fingerprint of the first set of segments to the meta-data.

17. The method of claim 14, wherein the slice analysis request is obtained from a computing device, wherein a plurality of frontend micro-services executing on the computing device receive the list of segments, wherein the plurality of backend micro-services are not executing on the computing device.

* * * * *